Nov. 28, 1967  A. E. FRANCIS  3,355,190
PIPE CONNECTORS
Filed April 5, 1965

United States Patent Office 3,355,190
Patented Nov. 28, 1967

3,355,190
PIPE CONNECTORS
Alan Edward Francis, Brisbane, Queensland, Australia, assignor to the English Electric Company Limited, London, England, a British company
Filed Apr. 5, 1965, Ser. No. 445,561
Claims priority, application Great Britain, Apr. 9, 1964, 14,746/64
6 Claims. (Cl. 285—50)

ABSTRACT OF THE DISCLOSURE

This invention is concerned with flexible pipe connectors for providing flexible connection between two parts of a fluid duct system. The invention provides a relatively simple connector in which a flexible metal bellows is sealed to and surrounds a tubular member, a cup-like member surrounds the bellows and is also sealed to the bellows, a cup-like device which surrounds the cup-like member seals a flange of this member to one part of the fluid duct system. The connector is generally cylindrical but is relatively very short in length compared with its diameter and can thus be accommodated within the thickness of a manifold cover. The connector is particularly suitable for providing a flow path for cooling liquid flowing between the shaft of a turbo-generator and the windings of the generator. For this use the connector is readily adapted electrically to isolate the rotor windings from the rotor shaft.

---

This invention relates to connectors for making a flexible connection between a manifold and part of a fluid duct system.

According to one aspect of the invention such a connector comprises a manifold cover having an internally threaded aperture, an annular seating face at the inner end of the threaded aperture, an aperture extending from the seating face to the other side of the manifold cover; a tubular member having one end arranged for connection to the associated fluid duct, a flange on the tubular member adjacent the other end thereof; a cup-like connector member having an annular side wall, an aperture in the base thereof, and a flange extending outward from the other end of the annular side wall, the cup-like member being positioned over the said other end of the tubular member with the said other end extending through the base aperture; a resilient metal bellows surrounding the tubular member disposed between the base of the cup-like member and the flange on the tubular member and sealed to the base of the cup-like member and to the flange on the tubular member; and an externally threaded cup-like device having a flat annular rim and an aperture in the base thereof disposed over the cup-like member with the tubular member extending through the aperture in the base of the cup-like device, the cup-like device being threadably engaged with the internally threaded aperture in the manifold cover so as to clamp the flange of the cup-like member in a fluid tight manner between the rim of the cup-like device and the annular seating face in the manifold cover.

Figure 1:
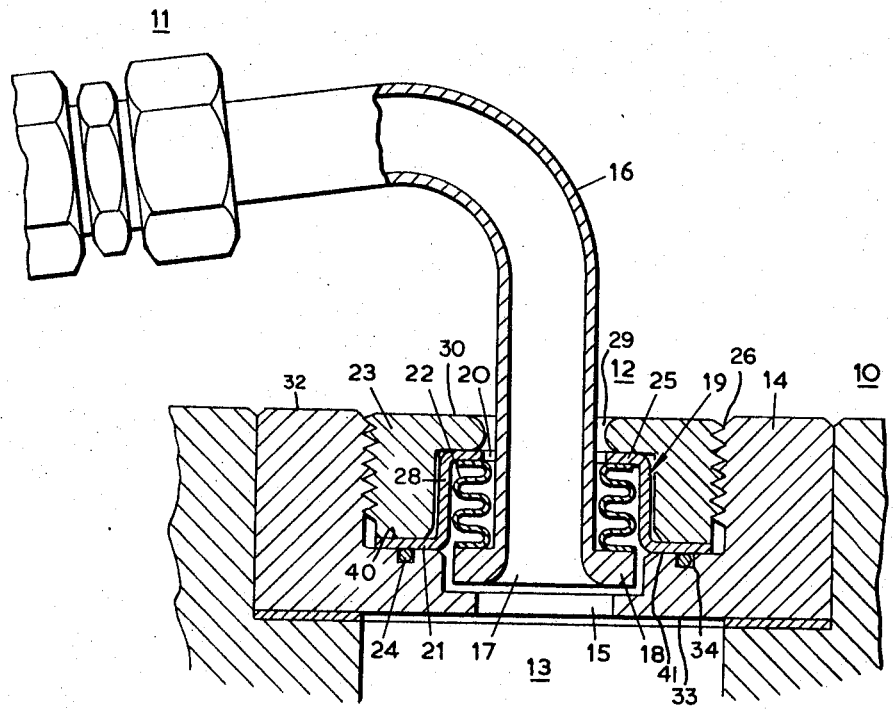
Figure 2:
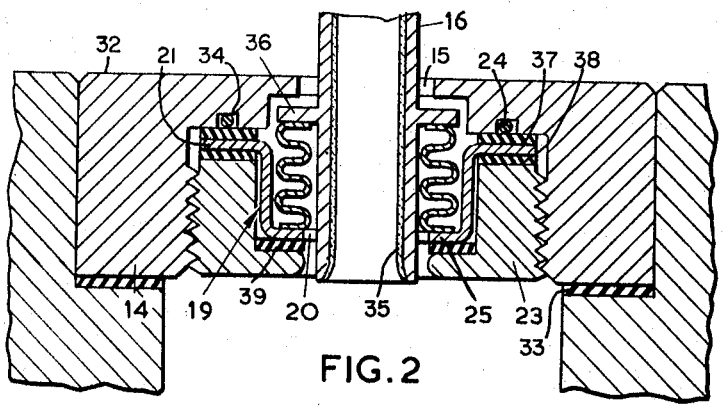

Two forms of connector in accordance with the invention and suitable for use in the cooling system of a liquid cooled rotor of a turbo generator will now be described, by way of example, with reference to the accompanying diagrammatic drawing in which:

FIG. 1 shows a longitudinal cross section through one form of connector in accordance with the invention and, FIG. 2 shows a longitudinal cross section through another form of the connector.

In FIG. 1 the reference 10 generally indicates part of the shaft of the rotor of a turbo generator and the reference 11 indicates a pipe connector which connects with a duct system for the flow of a cooling liquid for cooling the rotor windings (not shown). Liquid is delivered to the pipe connector 11 through the connector generally indicated at 12 from a manifold 13 in the rotor shaft.

The manifold is closed by a cover 14 which has an outer face 32 and an inner face 33 and which is secured in position by means (not shown). The connector 12 is secured in an aperture 26 in the manifold cover which has a seating face 41 about a further aperture 15 for allowing the passage of liquid to the connector.

The connector comprises a ducted or tubular member 16 shown as an elbow connection one end of which is connected to the connector 11 in any form of suitable fluid-tight joint. The other end of the member 16 is disposed adjacent the aperture 15 and this end of the member is formed with a flared opening 17 surrounded by a flange 18.

Encircling the end of the tubular member 16 is a cup-like connector member 19 having an annular side wall 28 with an inwardly projecting base or flange 25 at one end, and an outwardly projecting flange 21 at the other end thereof. The flange 25 surrounds an opening 20, through which the member 16 projects. A metal bellows 22 is disposed within the cup-like member encircling the end of the pipe and is secured to the inner face of the flange 25 of the cup-like member and the outer face of the flange 18. The bellows may be secured to both the cup-like member and pipe by any suitable form of connection such as brazing so as to form a fluid-tight joint.

The cup-like member 19 is secured to the manifold cover 14 by means of an externally threaded cup-like device 23 which at one end has a flat annular rim 40 about a large diameter aperture within which the member 19 is accommodated. The device 23 has a further aperture 29 in the base 30 thereof, and the tubular member 16 passes through this base aperture. The cup-like device 23 surrounds the outer surface of the cup-like member 19 and the rim 41 of the cup-like device clamps the flange 21 against the seating face 41 of the trough cover in which there is provided a sealing ring 24 contained within an annular trough or groove 34. The shape of the device 23 gives protection and support to the member 19.

In the modification of the invention shown in FIG. 2 the member 16 is formed with an unflanged end and the position of the member 19 is reversed so that the end of the member 16 projects through the opening 20 and the bellows or other sealing means sealed to a flange 36 on the member 16 and inner face of the flange 25. Such modified arrangement is secured by a plug or nut similar to 23, fitting into the inside of the manifold cover 14.

FIG. 2 also shows the provision of suitable well known electrical insulation which electrically isolates the tubular member 16 from the manifold cover 14 and rotor shaft 10. In this arrangement an electrically insulating washer 39 is disposed between the base 25 of the cup-like member 19 and the cup-like device 23.

A further pair of electrically insulating washers 37 and 38 are arranged on either side of the flange 21 of the cup-like member which is thus completely electrically insulated from the cup-like device 23, the manifold cover 14 and thus the whole of the rotor body.

FIG. 2 also shows the provision of electrically insulating material 35 on the interior of the tubular member 16. The material 35 may be a glass ceramic which extends the whole length of the interior of the tubular member 16 so as to provide an isolating path for liquid flowing in the tubular member so that the electrical resistance of the isolating path would be represented only by the resistance of the column of liquid within the tubular member 16.

Instead of providing the separate insulating washers 37, 38 and 39 the cup-like member could be provided with an electrically insulating coating of glass ceramic which would serve the same purpose as the washers.

Thus the connector can provide electrical insulation as well as serve its primary purpose of providing a flexible connection which will allow for relative movement between the shaft 10 and the rotor windings due to movements resulting from centrifugal force and expansion of parts of the rotor.

What I claim as my invention and desire to secure by Letters Patent is:

1. A connector device for providing a flexible connection between a manifold and an associated fluid duct, said connector device comprising, in combination; a manifold cover having an internally threaded aperture, an annular seating face at the inner end of the threaded aperture, an aperture extending from the seating face to the other side of the manifold cover; a tubular member having one end arranged for connection to the associated fluid duct, a flange on the tubular member adjacent the other end thereof; a cup-like connector member having an annular side wall, an aperture in the base thereof, and a flange extending outward from the other end of the annular side wall, the cup-like member being positioned over the said other end of the tubular member with the said other end extending through the base aperture; a resilient metal bellows surrounding the tubular member disposed between the base of the cup-like member and the flange on the tubular member and sealed to the base of the cup-like member and to the flange on the tubular member; and an externally threaded cup-like device having a flat annular rim and an aperture in the base thereof disposed over the cup-like member with the tubular member extending through the aperture in the base of the cup-like device, the cup-like device being threadably engaged with the internally threaded aperture in the manifold cover so as to clamp the flange of the cup-like member in a fluid tight manner between the rim of the cup-like device and the annular seating face in the manifold cover.

2. A connector device according to claim 1 in which the internally threaded aperture is formed in the outer face of the manifold cover and extends inwardly to the seating face, the manifold cover including an aperture extending from the seating face to the inner face of the manifold cover, the tubular member having a flange immediately adjacent the said other end thereof and extending through the cup-like member with the aperture in the base of the cup-like member disposed about the tubular member nearer to the outer face of the manifold cover than the inner face thereof.

3. A connector device according to claim 1 in which the internally threaded aperture extends from the inner face of the manifold cover outwardly to the seating face, the cover including an aperture which extends from the seating face to the outer face of the manifold cover, the tubular member having a flange which is positioned a short distance from the said other end thereof, the tubular member being positioned with the said other end projecting through the aperture which extends to the inner face of the manifold cover, the cup-like member being disposed about the tubular member with the base thereof nearer to the inner face of the manifold cover than the outer face thereof.

4. A connector device according to claim 1 including an annular groove in the seating face and a resilient sealing ring in the annular groove.

5. A connector device according to claim 1 including electrically insulating means disposed on either side of the flange of the cup-like member and electrically insulating means on the outer face of the base thereof for electrically insulating the cup-like member from the cup-like device and the manifold cover.

6. A connector device according to claim 1 in which the tubular member is lined with an electrically insulating material.

References Cited

UNITED STATES PATENTS

| | | |
|---|---|---|
| 1,586,725 | 6/1926 | Westinghouse et al. _ 285—226 X |
| 2,018,613 | 10/1935 | Hall _____ 285—300 |
| 2,183,596 | 12/1939 | Trinks _____ 285—189 X |
| 2,185,450 | 1/1940 | Wager _____ 285—226 X |
| 3,036,148 | 5/1962 | Swerdlow _____ 285—226 X |
| 3,038,553 | 6/1962 | Peters _____ 285—226 X |
| 3,053,554 | 9/1962 | Magos et al. _____ 285—226 X |

CARL W. TOMLIN, *Primary Examiner.*

R. G. BERKLEY, *Assistant Examiner.*